(12) United States Patent
Hajduczenia

(10) Patent No.: US 10,707,967 B1
(45) Date of Patent: Jul. 7, 2020

(54) SILENT START WHEN CONNECTING TO FIBER ACCESS NETWORK

(71) Applicant: Charter Communications Operating, LLC, St. Louis, MO (US)

(72) Inventor: Marek Hajduczenia, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/733,555

(22) Filed: Jan. 3, 2020

Related U.S. Application Data

(63) Continuation of application No. 16/372,920, filed on Apr. 2, 2019, now Pat. No. 10,601,512.

(51) Int. Cl.
| | |
|---|---|
| *H04B 10/00* | (2013.01) |
| *H04B 10/50* | (2013.01) |
| *H04J 14/02* | (2006.01) |
| *H04B 10/25* | (2013.01) |

(52) U.S. Cl.
CPC ............ *H04B 10/50* (2013.01); *H04B 10/25* (2013.01); *H04J 14/02* (2013.01)

(58) Field of Classification Search
USPC ...................................................... 398/66–73
See application file for complete search history.

(56) References Cited

U.S. PATENT DOCUMENTS

| | | | | |
|---|---|---|---|---|
| 8,537,730 | B2* | 9/2013 | Liu ..................... | H04B 10/0771 370/310 |
| 8,582,459 | B2* | 11/2013 | Hasegawa ............ | H04B 10/272 370/252 |
| 8,626,178 | B2* | 1/2014 | Johansen .......... | H04L 29/06027 455/450 |
| 9,860,618 | B2* | 1/2018 | Liu ..................... | H04Q 11/0067 |
| 2011/0020000 | A1* | 1/2011 | Hasegawa ........... | H04L 12/2861 398/58 |
| 2012/0063295 | A1* | 3/2012 | Bliss ..................... | H04L 1/0001 370/216 |
| 2013/0004174 | A1* | 1/2013 | Lee ..................... | H04J 14/0257 398/79 |
| 2013/0094862 | A1* | 4/2013 | Luo ..................... | H04J 14/0282 398/68 |
| 2014/0307572 | A1* | 10/2014 | Mungall ................ | H04L 41/12 370/252 |

(Continued)

*Primary Examiner* — Agustin Bello
(74) *Attorney, Agent, or Firm* — Young Basile Hanlon & MacFarlane, P.C.

(57) ABSTRACT

Disclosed herein are methods and systems for silent start when connecting a point-to-point (P2P) customer premises equipment (CPE) to a fiber access network. The P2P CPE may boot in a silent mode (by disabling an upstream optical transmitter) when the P2P CPE is connected to the fiber access network using a simplex fiber. Upstream transmissions are not sent by the P2P CPE unless a valid downstream signal with expected characteristics is detected by the P2P CPE. A valid downstream signal determination may indicate that the fiber access network is a P2P access network. A variety of characteristics may be used to validate the downstream signal including wavelength, a range of wavelengths, a line coding, a frame format, parity data, point to multipoint network information, point to point network information, logical link identifier, and a multi-point control protocol.

20 Claims, 11 Drawing Sheets

(56) References Cited

U.S. PATENT DOCUMENTS

| | | | |
|---|---|---|---|
| 2015/0103981 A1* | 4/2015 | Berg | H04M 3/306 |
| | | | 379/1.04 |
| 2016/0105253 A1* | 4/2016 | Liu | H04Q 11/0067 |
| | | | 398/67 |
| 2017/0222775 A1* | 8/2017 | Coomans | H04B 17/309 |
| 2017/0272982 A1* | 9/2017 | Wang | H04W 16/14 |
| 2018/0191455 A1* | 7/2018 | Luo | H04J 14/0235 |
| 2018/0199119 A1* | 7/2018 | Gao | H04J 14/0246 |
| 2019/0044813 A1* | 2/2019 | Oksman | H04L 43/10 |
| 2019/0165833 A1* | 5/2019 | Kassel | H04B 3/32 |
| 2019/0239262 A1* | 8/2019 | Wang | H04W 52/0261 |

\* cited by examiner

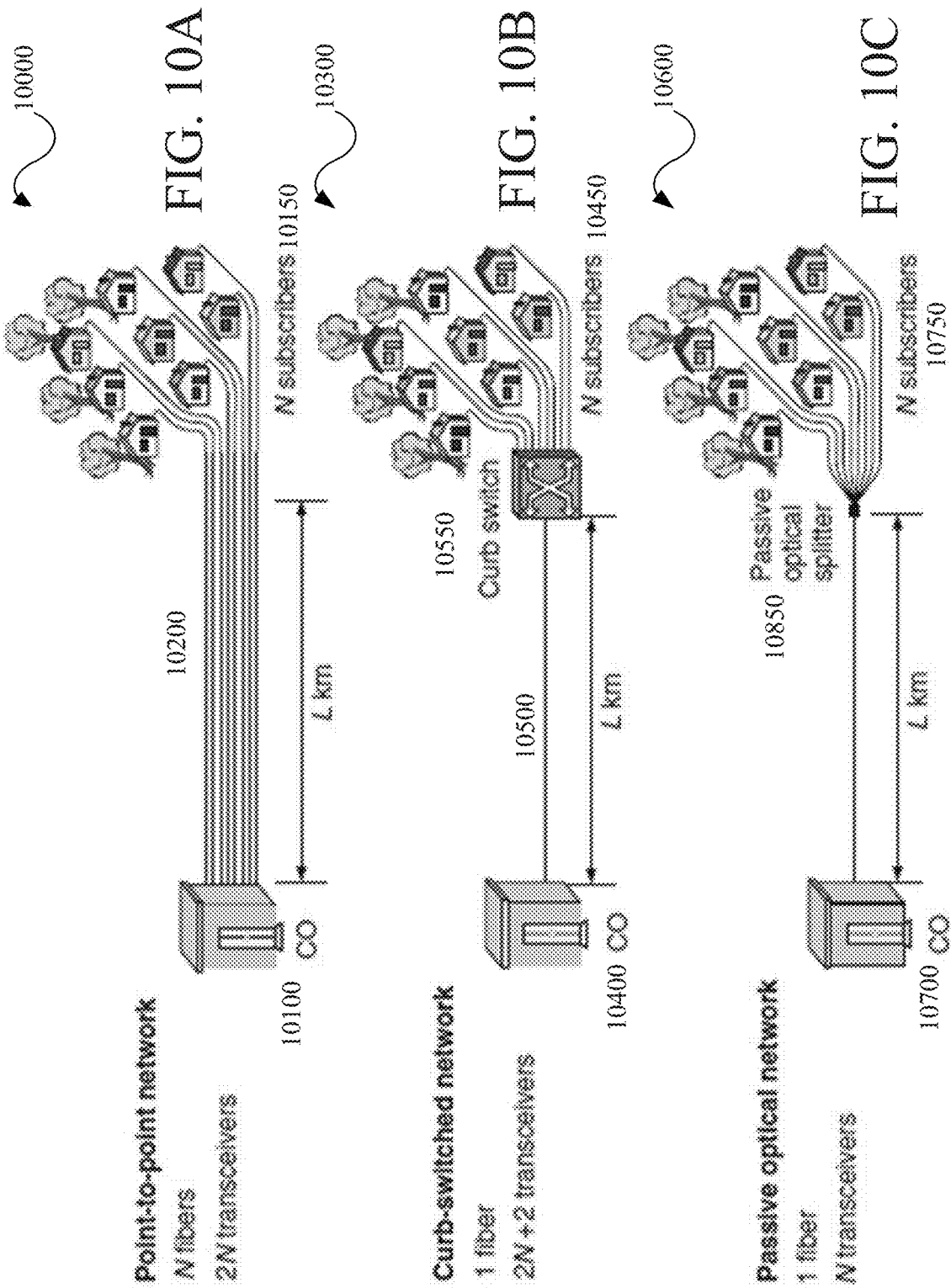

SILENT START WHEN CONNECTING TO FIBER ACCESS NETWORK

CROSS REFERENCE TO RELATED APPLICATIONS

This application is a continuation of U.S. patent application Ser. No. 16/372,920, filed on Apr. 2, 2019, the entire content of which is incorporated by reference.

TECHNICAL FIELD

This disclosure relates to connecting of devices using optical fiber. More specifically, this disclosure relates to connecting a fiber access network to customer premises equipment using a simplex fiber.

BACKGROUND

The Institute of Electrical and Electronics Engineers (IEEE) standards 802.3-based access networks (also referred to as Ethernet) can be classified generally into two major groups, i.e., shared media (referred to as point-to-multipoint (P2MP)) and dedicated media access (referred to as point-to-point (P2P)). P2P access networks are typically implemented over a duplex fiber (a fiber pair), with each fiber carrying optical signals in only one direction (from a hub to a customer premise, i.e., downstream, or from the customer premise to the hub, i.e., upstream). P2MP access networks (typically Passive Optical Network (PON)) are typically implemented over a simplex fiber (a single fiber), carrying optical signals in both upstream and downstream directions multiplexed into a single fiber using Wavelength Division Multiplexing (WDM) technology.

Along with the push for deeper fiber deployment in the access networks, a fiber strand is becoming a very expensive commodity and using a duplex fiber (pair of fibers) per customer in P2P access is becoming prohibitively expensive, especially when considering that a simple change in the signal multiplexing cuts down the number of required fibers per customer by half. The use of wavelength division multiplexing (WDM) for P2P access to drive the use of simplex fiber rather than duplex fiber was the premise for development of a class of simplex P2P access technologies under the so-called Ethernet in the First Mile (EFM) project in IEEE 802.3, providing 100 Mb/s and 1000 Mb/s access speeds. A new project (http://www.ieee802.org/3/NGBIDI/index.html) in IEEE 802.3 Working Group aims to provide simplex P2P access technologies for 10 Gb/s, 25 Gb/s, and 50 Gb/s speeds, while preserving the use of a single fiber in the access portion of the telecommunication network.

Along with the use of a simple fiber comes a problem. In the past, when P2P and P2MP used different numbers of fibers, there was no way for a field technician to make a mistake and connect a P2P Customer Premise Equipment (CPE) to a P2MP network or vice versa. Such CPE incompatibility was guaranteed using different fiber connectors, i.e., a dual Lucent Connector (LC) for P2P CPE and a single standard or subscriber connector (SC) for P2MP CPE. With the move of P2P access networks to simplex fiber comes also the move to the SC connector, i.e., currently both P2P and P2MP CPEs utilize the very same type of fiber connector, i.e., a single SC connector. This means that there is now a non-zero chance that a wrong CPE type is connected to a wrong network type, i.e., a P2P CPE is connected to a P2MP network or vice versa. For example, when a P2P CPE is connected to a P2MP network, such a device by default immediately starts transmitting in the upstream direction, effectively preventing the proper operation in the Time Division Multiplexing (TDM)-based upstream direction in a P2MP access network. In such a simple manner, one wrong P2P CPE connected to a P2MP network can take down a whole P2MP network and prevent any user from accessing the network resources.

SUMMARY

Disclosed herein are methods and systems for silent start when connecting a point-to-point (P2P) customer premises equipment (CPE) to a fiber access network. The P2P CPE may start (boot) in a silent mode when the P2P CPE is connected to the fiber access network using a simplex fiber. That is, an upstream optical transmitter is disabled. Upstream transmissions are not sent by the P2P CPE unless a valid downstream signal with expected, known, or defined features, parameters or characteristics is detected by the P2P CPE. A valid downstream signal determination may indicate that the fiber access network is a P2P access network. An invalid downstream signal determination may indicate that the fiber access network is a P2MP access network. A variety of characteristics may be used to validate the downstream signal including wavelength, a range of wavelengths, a line coding, a frame format, parity data, point to multipoint network information, point to point network information, logical link identifier, and a multi-point control protocol.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIGS. 10A-C are block diagrams of example fiber access network architectures.

DETAILED DESCRIPTION

Figure 1:
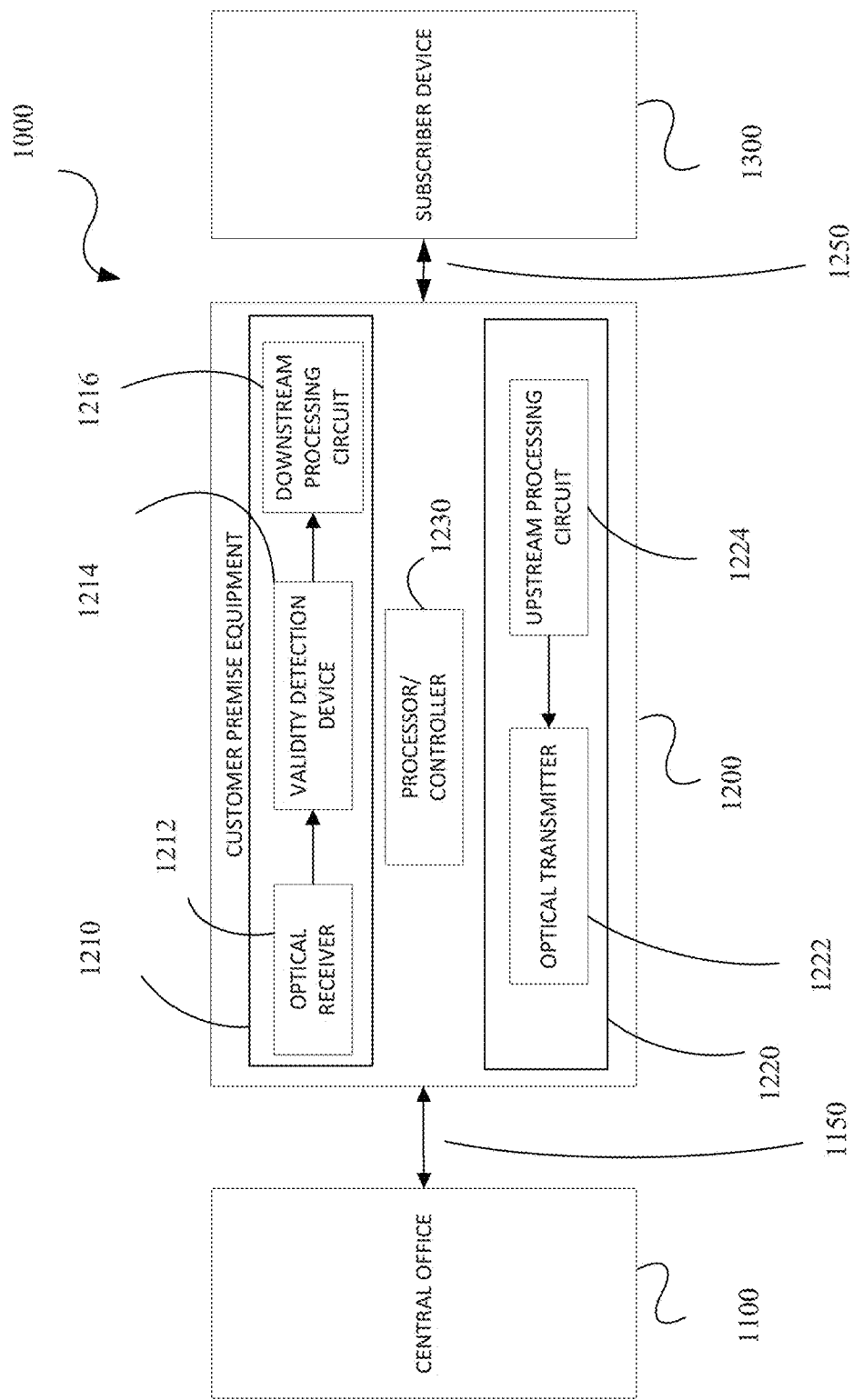
FIG. 1 is a diagram of an example architecture of a fiber access network in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Point-to-point (P2P) and point-to-multipoint (P2MP) are both used in telecommunication networks. FIGS. 10A-C are block diagrams of example network access architectures. FIG. 10A is a block diagram of a P2P network 10000 which may include a central office (CO) or hub 10100 and N subscribers 10150 which are connected using N duplex optical fibers (an optical fiber pair) 10200 and 2N transceivers (not shown). FIG. 10B is a block diagram of a curbswitched network 10300 which may include a CO 10400 and N subscribers 10450 which are connected using a simplex fiber (single fiber) 10500, a curb switch 10550, and 2N+2 transceivers (not shown). FIG. 10C is a block diagram of a P2MP network such as a Passive Optical Network (PON) 10600 which may include a CO 10700 and N subscribers 10750 which are connected using a simplex fiber (single fiber) 10800, a passive optical splitter 10850, and 2N+2 transceivers (not shown). Fiber herein refers to optical fiber and the like.

The P2P network provides dedicated fiber for upstream signaling and dedicated fiber for downstream signaling and is more directed towards high bandwidth, always on business customers with very strict service-level agreements (SLAs). The P2MP network uses a single fiber with multiplexing technology and access is typically associated with shared, best effort residential access, or lower tier business customers with less stringent SLAs. Both technologies will likely coexist in the access network domain for years to come.

Figure 11A:
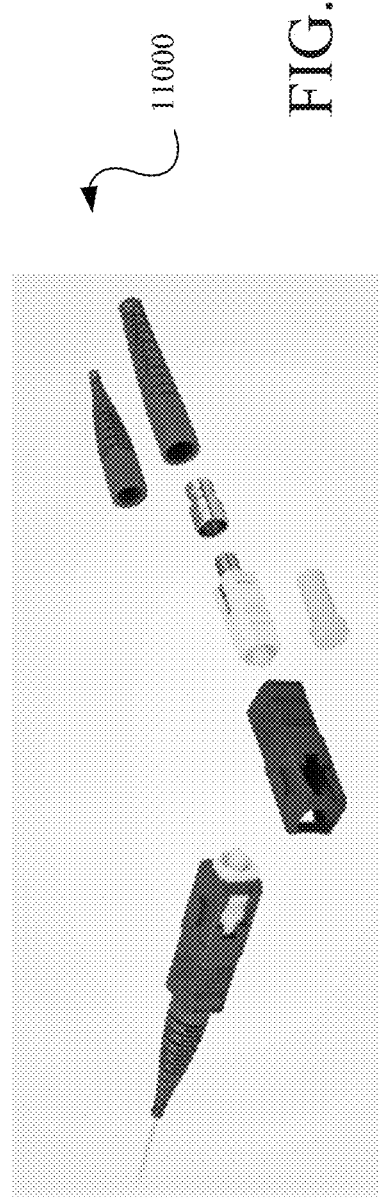
FIGS. 11A-B are block diagrams of an example fiber optic connectors.
Figure 11B:
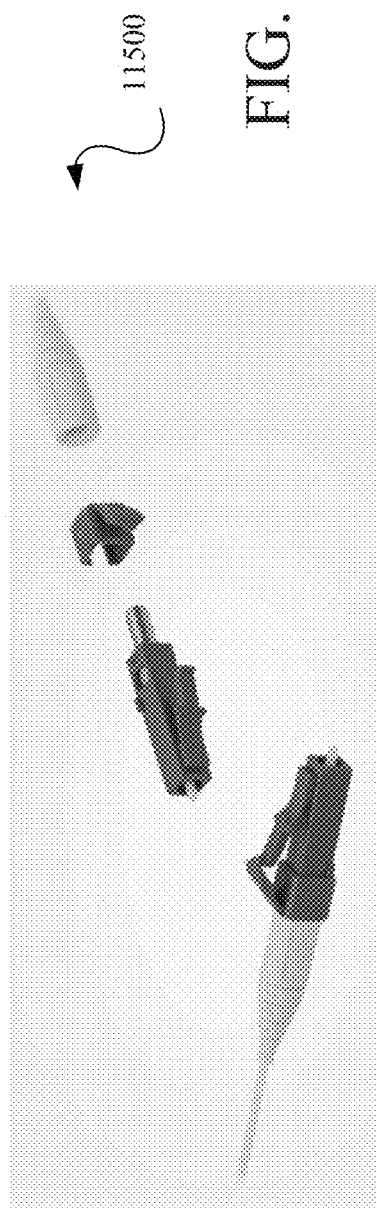

Fiber strand is becoming a very expensive commodity and using a duplex fiber (pair of fibers) per customer in P2P access is becoming prohibitively expensive, especially when considering that a simple change in the signal multiplexing cuts down the number of required fibers per customer by half. The use of single fiber and WDM multiplexing for P2P networks causes problems when connecting a Customer Premise Equipment (CPE) to a wrong network. Previously, a field technician could differentiate between P2P and P2MP due to the different numbers of fibers used for each network. Each required a different type of connector, i.e. a dual Lucent connector (LC) for P2P CPEs as shown in FIG. 11B and a single standard or subscriber connector (SC) for P2MP CPEs as shown in FIG. 11A. With the move of P2P networks to simplex fiber comes also the move to the SC connector. That is, both P2P and P2MP CPEs utilize the very same type of fiber connector, i.e., a single SC connector. This means that there is now a non-zero chance that a wrong CPE type is connected to a wrong network type, i.e., a P2P CPE is connected to a P2MP network or vice versa.

When a P2MP CPE (typically referred to as an Optical Network Unit (ONU)) is connected to a P2P network, such a device remains inactive (in silent mode), given the very nature of a P2MP network operation, where individual ONUs need to be explicitly scheduled by the Optical Line Terminal (OLT) located at the hub to be allowed to transmit in the upstream direction. In the lack of such an explicit scheduling, an ONU will remain silent, listening passively to downstream optical signals from the hub, but not transmitting anything in the upstream direction. A case of a P2MP CPE (ONU) connected to a P2P access network is therefore considered safe from the point of view of interfering with the operation of an access network or a fiber access network.

When a P2P CPE is connected to a P2MP network, such a device today by default immediately starts transmitting in the upstream direction, effectively preventing the proper operation in the Time Division Multiplexing (TDM)-based upstream direction in a P2MP access network. An incorrectly connected P2P CPE to a P2MP network can take down a whole P2MP network and prevent any user from accessing the access network resources.

Described herein are methods, devices and systems for silent start when connecting to a fiber access network. A P2P CPE should start or boot in a silent mode when the P2P CPE is connected to a fiber access network using a simplex fiber. For example, an upstream optical transmitter is disabled. Upstream transmissions are not sent by the P2P CPE unless a valid downstream signal with expected, known, or defined features, parameters or characteristics (collectively "defined characteristics") is detected by the P2P CPE. A valid downstream signal determination may indicate that the fiber access network is a P2P access network. An invalid downstream signal determination may indicate that the fiber access network is a P2MP access network. A variety of techniques may be used to detect the downstream signal as described herein to increase the reliability of detection.

In an implementation, a boot-up sequence is started, internal electronics are initialized, a downstream optical receiver is enabled, and an upstream optical transmitter is disabled when a P2P CPE is connected to an access network and powered on. A silent start procedure is initiated upon reception of a downstream optical signal. That is, the P2P CPE is in a silent mode with respect to upstream transmissions. The downstream optical signal is processed to determine whether the received downstream optical signal is a valid downstream optical signal. The validity determination may be done using a variety of techniques as described herein and may include one or more of the techniques in a variety of combinations.

In an implementation, the validity determination may include determining whether the downstream optical signal is at a defined wavelength or within a defined range of wavelengths. In an implementation, the validity determination may include determining whether the downstream optical signal is at a defined wavelength or within a defined range of wavelengths and that the downstream optical signal has been received for a defined period of time. For example, the defined period of time may be relative to the start of the silent start procedure. In an implementation, the defined period of time may be at least one second.

In an implementation, the validity determination may include identification of a valid line coding in the downstream optical signal. In an implementation, the validity determination may include identification of a valid line coding in the downstream optical signal and that the downstream optical signal has been received for a defined period of time. For example, the defined period of time may be relative to the start of the silent start procedure. In an implementation, the defined period of time may be at least one second.

In an implementation, the validity determination may include whether the downstream optical signal has an expected frame format. In an implementation, the validity determination may include whether the downstream optical signal has an expected frame format and that the downstream optical signal has been received for a defined period of time. For example, the defined period of time may be relative to the start of the silent start procedure. In an implementation, the defined period of time may be at least one second.

In an implementation, the validity determination may include whether decoded data matches transmitted parity data. In an implementation, the validity determination may include whether decoded data matches transmitted parity data and that the downstream optical signal has been received for a defined period of time. For example, the defined period of time may be relative to the start of the silent start procedure. In an implementation, the defined period of time may be at least one second.

In an implementation, the validity determination may include whether a received and decoded frame includes P2MP network information or P2P network information. In an implementation, the P2MP network information or P2P network information may be a logical link identifier (LLID)

information or any other information with similar functionality. In an implementation, the P2MP network information or P2P network information may be multi-point control protocol (MPCP) information or any other information with similar functionality. In an implementation, the validity determination may include whether a received and decoded frame includes P2MP network information or P2P network information and that the downstream optical signal has been received for a defined period of time. For example, the defined period of time may be relative to the start of the silent start procedure. In an implementation, the defined period of time may be at least one second.

If the received downstream optical signal is invalid, the P2P CPE remains in the silent mode. If the received downstream optical signal is assessed to be valid, the upstream optical transmitter is enabled. From this point onwards, the P2P CPE is engaged in bidirectional transmissions or communications with the hub or central office. Bidirectional transmissions are maintained on continued reception of valid downstream optical signals. If the downstream optical signals are lost for a defined period of time or are found to be invalid, the P2P CPE may enter or re-enter the silent mode or the silent start procedure. In an implementation, the defined period of time for loss of the downstream optical signals may be 20 milliseconds, depending on the size of the forward error correction (FEC) codeword (if used to validate downstream signal), line codeword, etc.

FIG. 1 is a diagram of an example architecture of a fiber access network 1000 in accordance with embodiments of this disclosure. In an implementation, the fiber access network 1000 may include a central office 1100 which may be connected to a CPE 1200 via a simplex fiber 1150. In an implementation, a hub may be used in lieu of or in addition to the central office. The CPE 1200 may be connected to a subscriber device 1300 using a variety of wired or wireless techniques 1250. The wired or wireless techniques 1250 may include, but is not limited to, pluggable interfaces such as small form-factor pluggable (SFP), enhanced SFP+, XFP and the like. In an implementation, the CPE 1200 is a P2P CPE. The central office 1100 may include servers, switches, transceivers, optical line terminal, and other equipment configured to transmit or stream downstream signals including data, content, and commands (collectively "data") to the CPE 1200 and receive upstream signals including data, content, and commands from the CPE 1200. As noted, the CPE 1200 communicates with the central office 1100 and also communicates with the subscriber device 1300. The subscriber device 1300 may be any type of device which may communicate via the CPE 1200 including, but not limited to, routers, televisions, set top boxes, phones, computers, smart devices, and the like.

The CPE 1200 may include, but is not limited to, a downstream circuit 1210, an upstream circuit 1220, and a processor or controller 1230 connected to or in communication with (collectively "connected to") the downstream circuit 1210 and the upstream circuit 1220. The processor 1230 may implement the silent start procedure in cooperation with the downstream circuit 1210 and the upstream circuit 1220 as described herein. The downstream circuit 1210 may include, but is not limited to, an optical receiver 1212, a validity detection device 1214 and a downstream processing circuit 1216. In an implementation, the validity detection device 1214 is the optical receiver 1212. The upstream processing circuit 1220 may include, but is not limited to, an optical transmitter 1222 and an upstream processing circuit 1224. The central office 1100, CPE 1200 and subscriber device 1300 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

In an implementation, the CPE 1200 is a P2P CPE. Operationally, the CPE 1200 is connected to the central office 1100 via the simplex fiber 1150. The CPE 1200 is then powered up. This initiates a boot-up sequence, initializes internal electronics, enables the optical receiver 1212, and disables the optical transmitter 1222. That is, the CPE 1200 is in a silent mode with respect to upstream optical transmissions. A silent start procedure is initiated upon detection and/or reception by the optical receiver 1212 of a downstream optical signal from the central office 1100. The validity detection device 1214 may determine or confirm that the downstream optical signal is a valid downstream optical signal with defined characteristics. The validity determination may be done using a variety of techniques which may include, but is not limited to, filtering at a defined wavelength(s), identifying a line coding, checking frame format or structure, confirming parity data, checking for P2MP network information, checking for P2P network information, checking a LLID information, checking a MPCP information, and the like. In an implementation, the validity determination may include determining whether the valid downstream optical signal has been received for a defined period of time. For example, the defined period of time may be relative to the start of the silent start procedure. In an implementation, the defined period of time may be at least one second. In an implementation, one or more of the validity determination techniques may be used in any combination to increase reliability of valid downstream optical signal detection. In this instance, validity is based on passing each of the validity determination techniques. That is, a single failure means that the downstream optical signal is invalid. In an implementation, aspects of the validity detection device 1214 may be implemented in the processor 1230.

The CPE 1200 remains in the silent mode (the optical transmitter 1222 remains disabled) if the received downstream optical signal is invalid. The downstream optical signal is processed through the downstream processing circuit 1216 and sent to the subscriber device 1300, and the optical transmitter 1222 is enabled (via coordination with the processor 1230) if the received downstream optical signal is valid. Data from the subscriber device 1300 may then be processed via the upstream processing circuit and transmitted by the optical transmitter 1222 to the CPE 1100 as upstream optical signals. At this point, the CPE 1200 may be engaged in bidirectional transmissions or communications with the central office 1100. Bidirectional transmissions are maintained on continued reception of valid downstream optical signals. If the downstream optical signals are lost for a defined period of time or are found to be invalid, the CPE 1200 may enter or re-enter the silent mode or the silent start procedure. That is, the optical transmitter 1222 may be disabled. In an implementation, the defined period of time for loss of the downstream optical signals may be 20 milliseconds.

Figure 2:
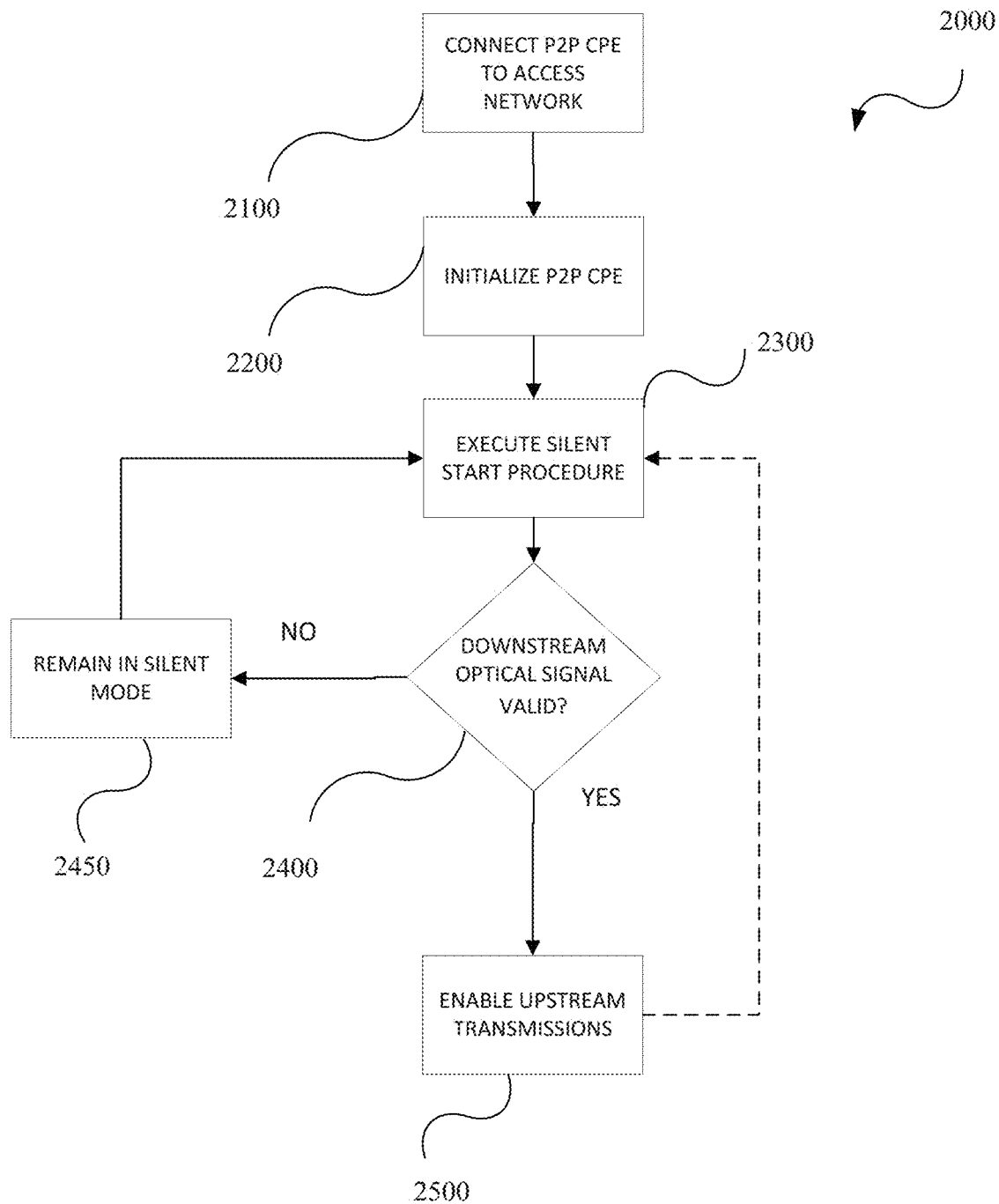
FIG. 2 is a flowchart of an example method for silent start when connecting to a fiber access network using the customer premises equipment (CPE) of in accordance with embodiments of this disclosure.

FIG. 2 is a flowchart of an example method 2000 for silent start when connecting to a fiber access network in accordance with embodiments of this disclosure. The method 2000 includes: connecting 2100 a P2P CPE to a fiber access network; initializing 2200 the P2P CPE; executing 2300 a silent start procedure; determining 2400 a validity of a downstream optical signal; remaining 2450 in a silent mode if invalid downstream optical signal; and enabling 2500 upstream transmissions if valid downstream optical signal. For example, the technique 2000 may be implemented, as applicable and appropriate, by the CPE 1200 of FIG. 1.

The method 2000 includes connecting 2100 a P2P CPE to a fiber access network. In an implementation, the P2P CPE is connected to the fiber access network using a SC. In an implementation, the fiber access network may a P2P access network or a P2MP access network.

The method 2000 includes initializing 2200 the P2P CPE. The initializing 2200 may include powering up the P2P CPE and then starting a boot-up sequence, initializing internal electronics, enabling downstream optical receiver, and disabling upstream optical transmitter. The P2P CPE is in a silent mode.

The method 2000 includes executing 2300 a silent start procedure. The executing 2300 may include receiving a downstream optical signal from a central office or hub and then starting the silent start procedure.

The method 2000 includes determining 2400 a validity of a downstream optical signal. In an implementation, the determining 2400 determines whether the downstream optical signal has one or more defined characteristics with respect to either a P2P access network or a P2MP access network. In an implementation, the determining 2400 determines whether the downstream optical signal lacks one or more defined characteristics with respect to either a P2P access network or a P2MP access network. In an implementation, the defined characteristics may include, but is not limited to, wavelength(s), line coding, frame format or structure, parity data, P2MP network information, P2P network information, LLID information, MPCP information, and the like. In an implementation, the determining 2400 determines whether the downstream optical signals are being received for a defined period of time. In an implementation, the defined period of time is relative to the start of the silent procedure. In an implementation, the defined period of time is 1 second.

The method 2000 includes remaining 2450 in a silent mode if invalid downstream optical signal. The upstream optical transmitter remains disabled if the downstream optical signal is invalid. In an implementation, if multiple defined characteristics are being checked, then all defined characteristics must confirm to mark downstream optical signal as being valid. The downstream optical signal is marked invalid if any of the defined characteristics is not confirmed.

The method 2000 includes enabling 2500 upstream transmissions if valid downstream optical signal. The upstream optical transmitter is enabled if the downstream optical signal is valid. This enables bidirectional communications between the P2P CPE and central office or hub. In an implementation, once upstream transmissions are enabled, the enabling 2500 may include determining for downstream optical signal communications loss. For example, if the downstream optical signals are lost for a defined period of time, the P2P CPE may enter or re-enter the silent mode or the silent start procedure. That is, the upstream optical transmitter may be disabled. The In an implementation, the defined period of time for loss of the downstream optical signals may be 20 milliseconds. In an implementation, once upstream transmissions are enabled, the enabling 2500 may include determining a validity of additional downstream optical signals. If any of the additional downstream optical signals are invalid, the P2P CPE may enter or re-enter the silent mode or the silent start procedure. That is, the upstream optical transmitter may be disabled. In an implementation, once upstream transmissions are enabled, the enabling 2500 may include periodically determining a validity of additional downstream optical signals. If any of the additional downstream optical signals are invalid, the P2P CPE may enter or re-enter the silent mode or the silent start procedure. That is, the upstream optical transmitter may be disabled.

Figure 3:
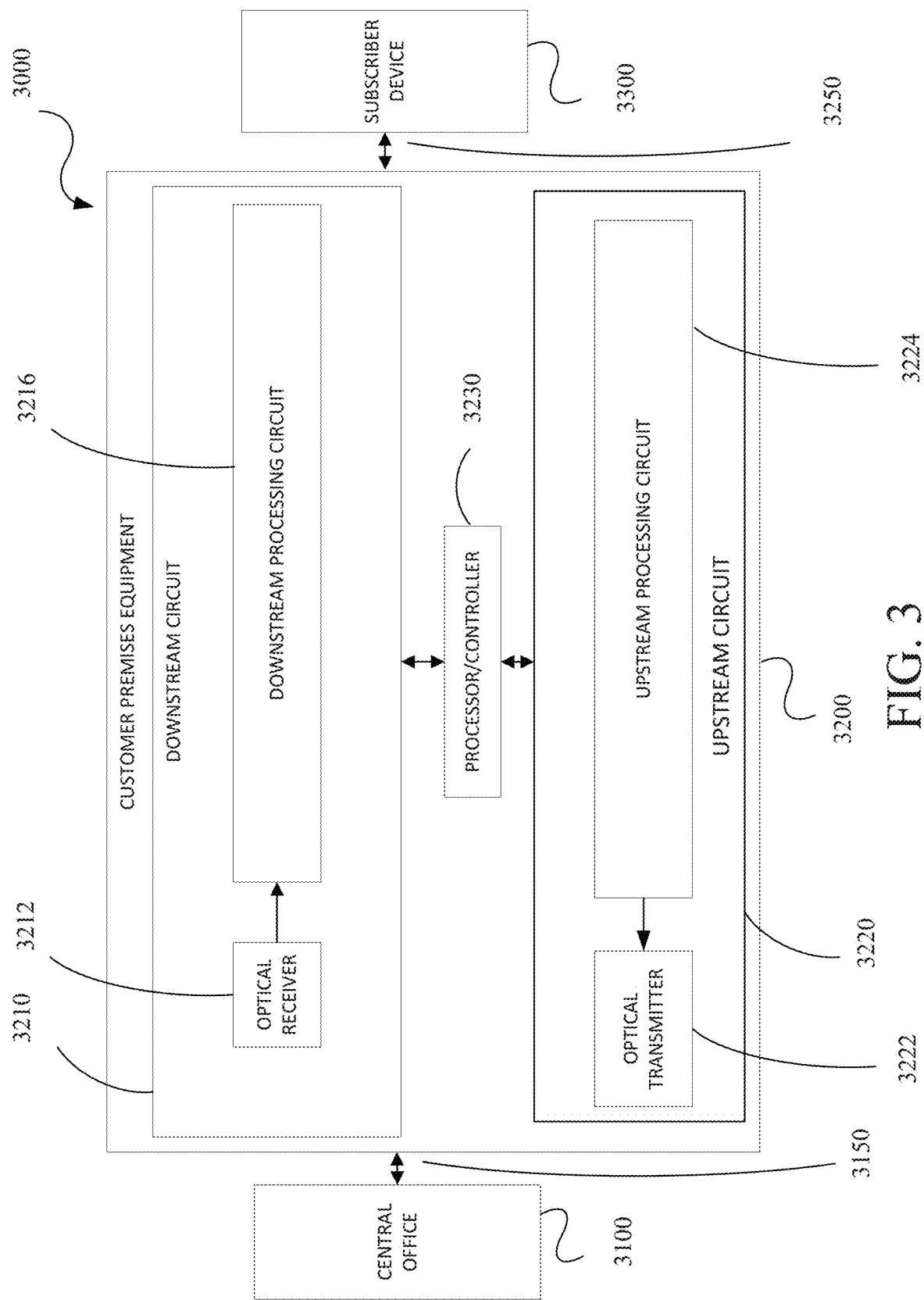
FIG. 3 is a diagram of an example architecture of a fiber access network with an example block diagram of a CPE in accordance with embodiments of this disclosure.

FIG. 3 is a diagram of an example architecture of a fiber access network 3000 in accordance with embodiments of this disclosure. In an implementation, the fiber access network 3000 may include a central office 3100 which may be connected to a CPE 3200 via a simplex fiber 3150. In an implementation, a hub may be used in lieu of or in addition to the central office. The CPE 3200 may be connected to a subscriber device 3300 using a variety of wired or wireless techniques 3250. In an implementation, the CPE 3200 is a P2P CPE. The central office 3100 may include servers, switches, transceivers, optical line terminal, and other equipment configured to transmit or stream downstream signals including data, content, and commands (collectively "data") to the CPE 3200 and receive upstream signals including data, content, and commands from the CPE 3200. As noted, the CPE 3200 communicates with the central office 3100 and also communicates with the subscriber device 3300. The subscriber device 3300 may be any type of device which may communicate via the CPE 3200 including, but not limited to, routers, televisions, set top boxes, phones, computers, smart devices, and the like.

The CPE 3200 may include, but is not limited to, a downstream circuit 3210, an upstream circuit 3220, and a processor or controller 3230 connected to the downstream circuit 3210 and the upstream circuit 3220. The processor 3230 may implement the silent start procedure in cooperation with the downstream circuit 3210 and the upstream circuit 3220 as described herein. The downstream circuit 3210 may include, but is not limited to, an optical receiver 3212 and a downstream processing circuit 3216. The upstream processing circuit 3220 may include, but is not limited to, an optical transmitter 3222 and an upstream processing circuit 3224. The central office 3100, CPE 3200 and subscriber device 3300 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

In an implementation, the optical receiver 3212 may be configured to receive a defined, expected or identified (collectively "defined") wavelength or wavelength range for a received downstream optical signal. The optical receiver 3212 may be implemented as a narrowband optical receiver which is fine-tuned to only receive a defined downstream optical signal from a P2P central office or hub device and rejects other downstream optical signals. In an implementation, the optical receiver 3212 may use high precision optical filters to narrow down the sensitivity window for the optical receiver 3212. Other approaches may be used without departing from the scope of the specification and claims. Consequently, when the CPE 3200 is connected to a P2MP access network which uses a different downstream wavelength range, the CPE 3200 will not be able to detect any optical signal and remain in the silent start procedure indefinitely. In this instance, the optical receiver 3212 functions or operates as a layer 1 or physical layer validity detection device.

In an implementation, the CPE 3200 is a P2P CPE. Operationally, the CPE 3200 is connected to the central office 3100 via the simplex fiber 3150. The CPE 3200 is then powered up. This initiates a boot-up sequence, initializes internal electronics, enables the optical receiver 3212, and disables the optical transmitter 3222. That is, the CPE 3200 is in a silent mode with respect to upstream optical transmissions. A silent start procedure is initiated upon detection by the optical receiver 3212 of a downstream optical signal from the central office 3100. The optical receiver 3212 may effectively determine or confirm that the downstream optical signal is a valid downstream optical signal by receiving defined wavelengths and/or filtering out wavelengths outside the defined wavelengths. In an implementation, valid downstream optical signals may need to be received for a defined period of time. For example, the defined period of time may be relative to the start of the silent start procedure. In an implementation, the defined period of time may be at least one second.

The CPE 3200 remains in the silent mode (the optical transmitter 1222 remains disabled) if a wavelength of the received downstream optical signal is not the defined wavelength. The downstream optical signal is processed through the downstream processing circuit 3216 and sent to the subscriber device 3300, and the optical transmitter 3222 is enabled (via coordination with the processor 3230) if the wavelength of the received downstream optical signal does match the defined wavelength. Data from the subscriber device 3300 may then be processed via the upstream processing circuit and transmitted by the optical transmitter 3222 to the CPE 3100 as upstream optical signals. At this point, the CPE 3200 may be engaged in bidirectional transmissions or communications with the central office 3100. Bidirectional transmissions are maintained on continued reception of valid downstream optical signals. If the downstream optical signals are lost for a defined period of time or are found to be invalid, the CPE 3200 may enter or re-enter the silent mode or the silent start procedure. That is, the optical transmitter 3222 may be disabled. In an implementation, the defined period of time for loss of the downstream optical signals may be 20 milliseconds.

Figure 4:
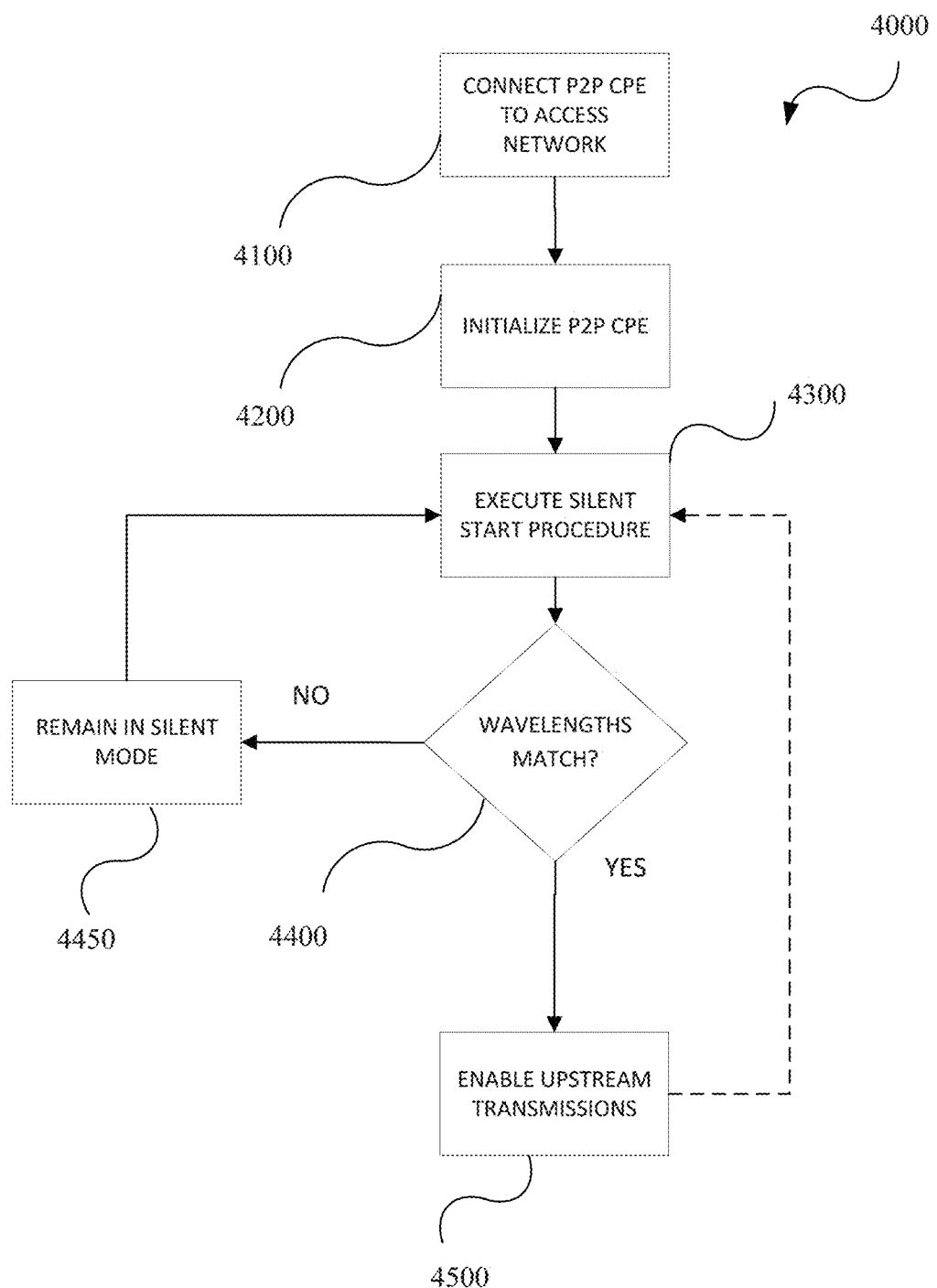
FIG. 4 is a flowchart of an example method for silent start when connecting to a fiber access network using the CPE of FIG. 3 in accordance with embodiments of this disclosure.

FIG. 4 is a flowchart of an example method 4000 for silent start when connecting to a fiber access network in accordance with embodiments of this disclosure. The method 4000 includes: connecting 4100 a P2P CPE to a fiber access network; initializing 4200 the P2P CPE; executing 4300 a silent start procedure; matching 4400 a wavelength or wavelength range of a downstream optical signal; remaining 4450 in a silent mode if wavelength mismatch; and enabling 4500 upstream transmissions if wavelengths match. For example, the technique 4000 may be implemented, as applicable and appropriate, by the CPE 1200 of FIG. 1 and the CPE 3200 of FIG. 3.

The method 4000 includes connecting 4100 a P2P CPE to a fiber access network. In an implementation, the P2P CPE is connected to the fiber access network using a SC. In an implementation, the fiber access network may a P2P access network or a P2MP access network.

The method 4000 includes initializing 4200 the P2P CPE. The initializing 4200 may include powering up the P2P CPE and then starting a boot-up sequence, initializing internal electronics, enabling downstream optical receiver, and disabling upstream optical transmitter. The P2P CPE is in a silent mode.

The method 4000 includes executing 4300 a silent start procedure. The executing 4300 may include detecting a downstream optical signal from a central office or hub and then starting the silent start procedure.

The method 4000 includes filtering 4400 on a desired wavelength or wavelength range for a downstream optical signal. In an implementation, an optical receiver is configured to receive the desired wavelength or wavelength range and filter out other wavelengths. In an implementation, P2P access networks or a P2MP access networks may use different wavelengths. In an implementation, the filtering 4400 may include determining that the downstream optical signals are being received for a defined period of time. In an implementation, the defined period of time is relative to the start of the silent procedure. In an implementation, the defined period of time is 1 second.

The method 4000 includes remaining 4450 in a silent mode if wavelength mismatch. The upstream optical transmitter remains disabled if the wavelength of the downstream optical signal is outside the range of the optical receiver. The optical receiver will not see the downstream optical signal.

The method 4000 includes enabling 4500 upstream transmissions if wavelengths match. The upstream optical transmitter is enabled if the wavelength of the downstream optical signal is within the filter range of the optical receiver. This enables bidirectional communications between the P2P CPE and central office or hub. In an implementation, once upstream transmissions are enabled, the enabling 4500 may include determining for downstream optical signal communications loss. For example, if the downstream optical signals are lost for a defined period of time, the P2P CPE may enter or re-enter the silent mode or the silent start procedure. That is, the upstream optical transmitter may be disabled. In an implementation, the defined period of time for loss of the downstream optical signals may be 20 milliseconds. In an implementation, once upstream transmissions are enabled, the enabling 4500 may include determining a validity of additional downstream optical signals. If any of the additional downstream optical signals are invalid, the P2P CPE may enter or re-enter the silent mode or the silent start procedure. That is, the upstream optical transmitter may be disabled. In an implementation, once upstream transmissions are enabled, the enabling 4500 may include periodically determining a validity of additional downstream optical signals. If any of the additional downstream optical signals have wavelength mismatch, the P2P CPE may enter or re-enter the silent mode or the silent start procedure. That is, the upstream optical transmitter may be disabled.

Figure 5:
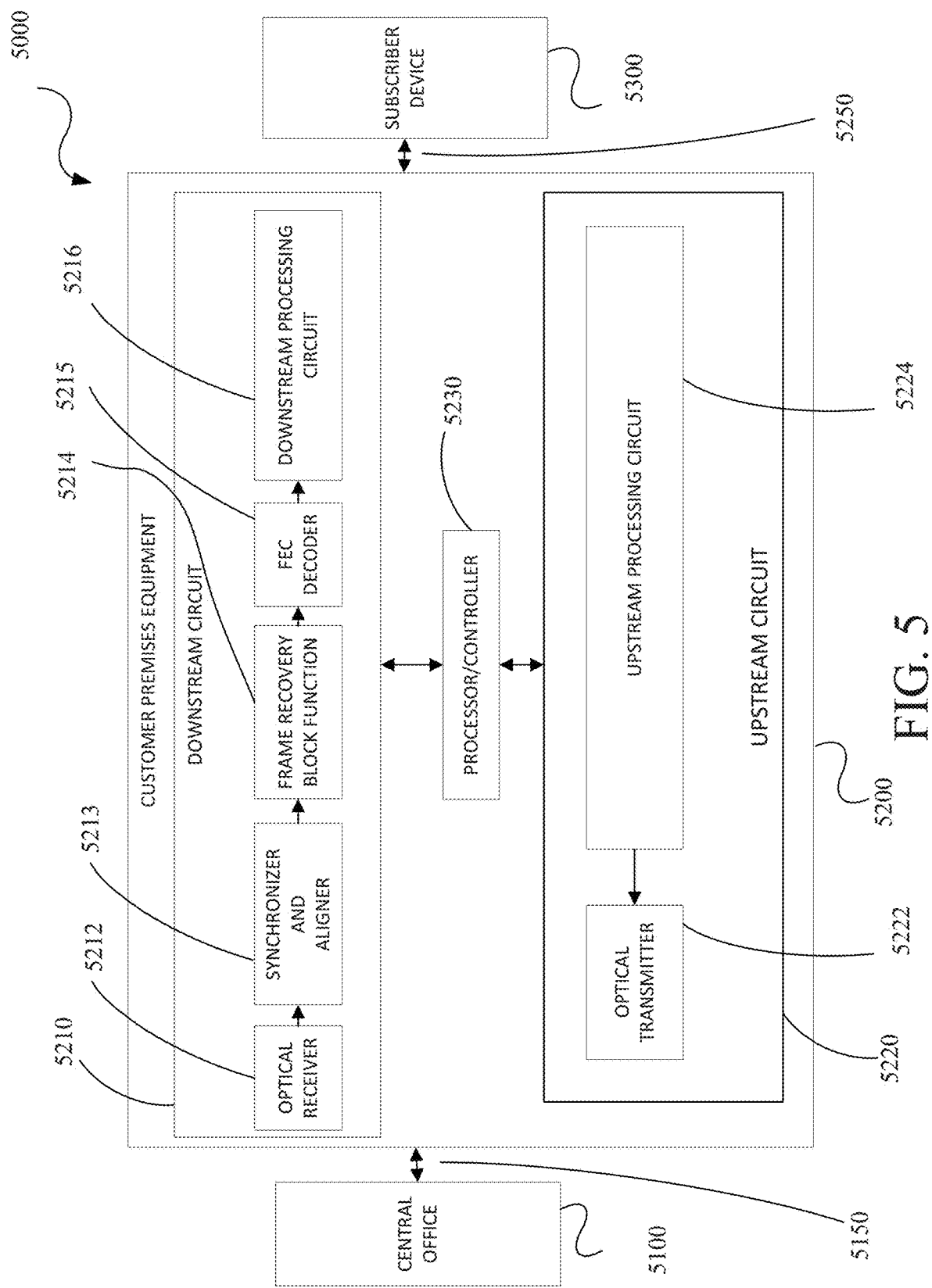
FIG. 5 is a diagram of an example architecture of a fiber access network with an example block diagram of a customer premises equipment (CPE) in accordance with embodiments of this disclosure.

FIG. 5 is a diagram of an example architecture of a fiber access network 5000 in accordance with embodiments of this disclosure. In an implementation, the fiber access network 5000 may include a central office 5100 which may be connected to a CPE 5200 via a simplex fiber 5150. In an implementation, a hub may be used in lieu of or in addition to the central office. The CPE 5200 may be connected to a subscriber device 5300 using a variety of wired or wireless techniques 5250. In an implementation, the CPE 5200 is a P2P CPE. The central office 5100 may include servers, switches, transceivers, optical line terminal, and other equipment configured to transmit or stream downstream signals including data to the CPE 5200 and receive upstream signals including data from the CPE 5200. As noted, the CPE 5200 communicates with the central office 5100 and also communicates with the subscriber device 5300. The subscriber device 5300 may be any type of device which may communicate via the CPE 5200 including, but not limited to, routers, televisions, set top boxes, phones, computers, smart devices, and the like.

The CPE 5200 may include, but is not limited to, a downstream circuit 5210, an upstream circuit 5220, and a processor or controller 5230 connected to the downstream circuit 5210 and the upstream circuit 5220. The processor 5230 may implement the silent start procedure in cooperation with the downstream circuit 5210 and the upstream circuit 5220 as described herein. The downstream circuit 5210 may include, but is not limited to, an optical receiver 5212, a synchronizer and aligner 5213, a frame recovery block function 5214, a forward error correction (FEC) decoder 5215, and a downstream processing circuit 5216. The upstream processing circuit 5220 may include, but is not limited to, an optical transmitter 5222 and an upstream processing circuit 5224. The central office 5100, CPE 5200 and subscriber device 5300 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The synchronizer and aligner 5213 and the frame recovery block function 5214 may function or operate as low-level bit stream validity detection device. In an implementation, the low-level bit stream validity detection device may determine if a line coding used in the downstream optical signal is for a P2P access network or for a P2MP access network. In an implementation, the low-level bit stream validity detection device may also determine if a frame structure used in the downstream optical signal is for a P2P access network or for a P2MP access network.

In an implementation, the synchronizer and aligner 5213 processes the received downstream optical signal to identify bit boundaries and synchronize with the received downstream optical signal's clock. Upon successful synchronization, the frame recovery block function 5214 may recover framing information through continuous attempts to decode incoming frames at all possible locations, and determine whether valid data frames are observed. In an implementation, the frame recovery block function 5214 may coordinate with the processor 5230 to initiate or remain in the silent mode if a defined line coding is not detected or determined. If the line coding is valid, the frame recovery block function 5214 may determine if a defined frame structure is not detected or determined. If the frame structure is invalid, the frame recovery block function 5214 may coordinate with the processor 5230 to initiate or remain in the silent mode. If the line coding and the frame structure are both valid, the frame recovery block function 5214 may coordinate with the processor 5230 to enable the upstream optical receiver 5222.

In an implementation, the synchronizer and aligner 5213, the frame recovery block function 5214, and the FEC decoder 5215 may function or operate as low-level bit stream validity detection device. If the line coding and the frame structure are both valid, and the data is FEC encoded, the FEC decoder 5215 may attempt to decode the FEC encoded codewords and verify decoded data against transmitted parity data to confirm that valid data was recovered. If the parity check fails, the FEC decoder 5215 may coordinate with the processor 5230 to initiate or remain in the silent mode. If the parity check passes, the FEC decoder 5215 may coordinate with the processor 5230 to enable the upstream optical receiver 5222.

In an implementation, the CPE 5200 is a P2P CPE. Operationally, the CPE 5200 is connected to the central office 5100 via the simplex fiber 5150. The CPE 5200 is then powered up. This initiates a boot-up sequence, initializes internal electronics, enables the optical receiver 5212, and disables the optical transmitter 5222. That is, the CPE 5200 is in a silent mode with respect to upstream optical transmissions. A silent start procedure is initiated upon detection and/or reception by the optical receiver 5212 of a downstream optical signal from the central office 5100. The low-level bit stream validity detection device may determine or confirm that the downstream optical signal is a valid downstream optical signal based on line coding, frame structure, parity data, and/or combinations thereof. In an implementation, the validity determination may include determining whether the valid downstream optical signal has been received for a defined period of time. For example, the defined period of time may be relative to the start of the silent start procedure. In an implementation, the defined period of time may be at least one second. In an implementation, one or more of the line coding, frame structure, parity data, and/or combinations thereof may be used in any combination to increase reliability of valid downstream optical signal detection. In this instance, validity is based on passing each of the line coding, frame structure, parity data, and/or combinations thereof. That is, a single failure means that the downstream optical signal is invalid.

The CPE 5200 remains in the silent mode (the optical transmitter 5222 remains disabled) if the received downstream optical signal is invalid. The downstream optical signal is processed through the downstream processing circuit 5216 and sent to the subscriber device 5300, and the optical transmitter 5222 is enabled (via coordination with the processor 5230) if the received downstream optical signal is valid. Data from the subscriber device 5300 may then be processed via the upstream processing circuit and transmitted by the optical transmitter 5222 to the CPE 5100 as upstream optical signals. At this point, the CPE 5200 may be engaged in bidirectional transmissions or communications with the central office 5100. Bidirectional transmissions are maintained on continued reception of valid downstream optical signals. If the downstream optical signals are lost for a defined period of time or are found to be invalid, the CPE 5200 may enter or re-enter the silent mode or the silent start procedure. That is, the optical transmitter 5222 may be disabled. In an implementation, the defined period of time for loss of the downstream optical signals may be 20 milliseconds.

Figure 6:
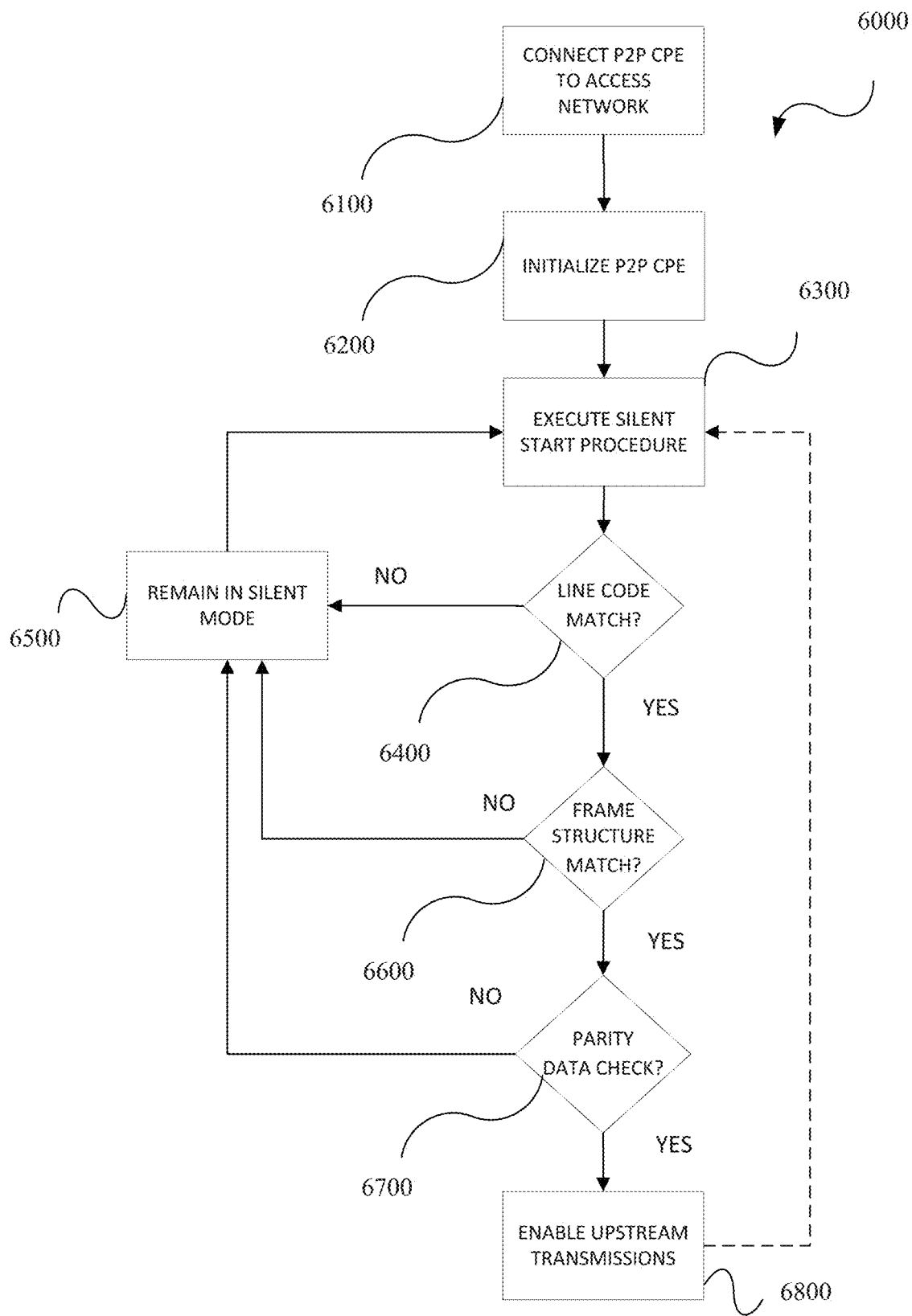
FIG. 6 is a flowchart of an example method for silent start when connecting to a fiber access network using the CPE of FIG. 5 in accordance with embodiments of this disclosure.

FIG. 6 is a flowchart of an example method 6000 for silent start when connecting to a fiber access network in accordance with embodiments of this disclosure. The method 6000 includes: connecting 6100 a P2P CPE to a fiber access network; initializing 6200 the P2P CPE; executing 6300 a silent start procedure; determining 6400 a line coding of a downstream optical signal; remaining 6500 in a silent mode if invalid line coding; determining 6600 a frame structure of the downstream optical signal; remaining 6500 in a silent mode if invalid frame structure; determining 6700 a parity data check for the downstream optical signal; remaining 6500 in a silent mode if parity data check fails; and enabling 6800 upstream transmissions if valid downstream optical signal. For example, the technique 6000 may be implemented, as applicable and appropriate, by the CPE 1200 of FIG. 1 and the CPE 5200 of FIG. 5.

The method 6000 includes connecting 6100 a P2P CPE to a fiber access network. In an implementation, the P2P CPE is connected to the fiber access network using a SC. In an implementation, the fiber access network may a P2P access network or a P2MP access network.

The method 6000 includes initializing 6200 the P2P CPE. The initializing 6200 may include powering up the P2P CPE and then starting a boot-up sequence, initializing internal electronics, enabling downstream optical receiver, and disabling upstream optical transmitter. The P2P CPE is in a silent mode.

The method 6000 includes executing 6300 a silent start procedure. The executing 6300 may include receiving a downstream optical signal from a central office or hub and then starting the silent start procedure.

The method 6000 includes determining 6400 a line coding of a downstream optical signal. In an implementation, the determining 2400 may include determining that the downstream optical signals are being received for a defined period of time. In an implementation, the defined period of time is relative to the start of the silent procedure. In an implementation, the defined period of time is 1 second.

The method 6000 includes remaining 6500 in a silent mode if invalid line coding. The upstream optical transmitter remains disabled if invalid line coding.

The method 6000 includes determining 6600 a frame structure of the downstream optical signal. In an implementation, the determining 6600 a frame structure of the downstream optical signal is optional. In an implementation, the determining 2400 may include determining that the downstream optical signals are being received for a defined period of time. In an implementation, the defined period of time is relative to the start of the silent procedure. In an implementation, the defined period of time is 1 second.

The method 6000 includes remaining 6500 in a silent mode if invalid frame structure. The upstream optical transmitter remains disabled if invalid frame structure.

The method 6000 includes determining 6700 a parity data check for the downstream optical signal. In an implementation, the determining 6700 a parity data check for the downstream optical signal is optional. In an implementation, the determining 2400 may include determining that the downstream optical signals are being received for a defined period of time. In an implementation, the defined period of time is relative to the start of the silent procedure. In an implementation, the defined period of time is 1 second.

The method 6000 includes remaining 6500 in a silent mode if parity data check fails. The upstream optical transmitter remains disabled if parity data check fails.

The method 6000 includes enabling 6800 upstream transmissions if line coding, frame structure (when applicable), and parity data check (when applicable) of the downstream optical signal are valid. The upstream optical transmitter is enabled if the downstream optical signal is valid. This enables bidirectional communications between the P2P CPE and central office or hub. In an implementation, once upstream transmissions are enabled, the enabling 6800 may include determining for downstream optical signal communications loss. For example, if the downstream optical signals are lost for a defined period of time, the P2P CPE may enter or re-enter the silent mode or the silent start procedure. That is, the upstream optical transmitter may be disabled. The In an implementation, the defined period of time for loss of the downstream optical signals may be 20 milliseconds. In an implementation, once upstream transmissions are enabled, the enabling 6800 may include determining a validity of additional downstream optical signals. If any of the additional downstream optical signals are invalid, the P2P CPE may enter or re-enter the silent mode or the silent start procedure. That is, the upstream optical transmitter may be disabled. In an implementation, once upstream transmissions are enabled, the enabling 6800 may include periodically determining a validity of additional downstream optical signals. If any of the additional downstream optical signals are invalid, the P2P CPE may enter or re-enter the silent mode or the silent start procedure. That is, the upstream optical transmitter may be disabled.

Figure 7:
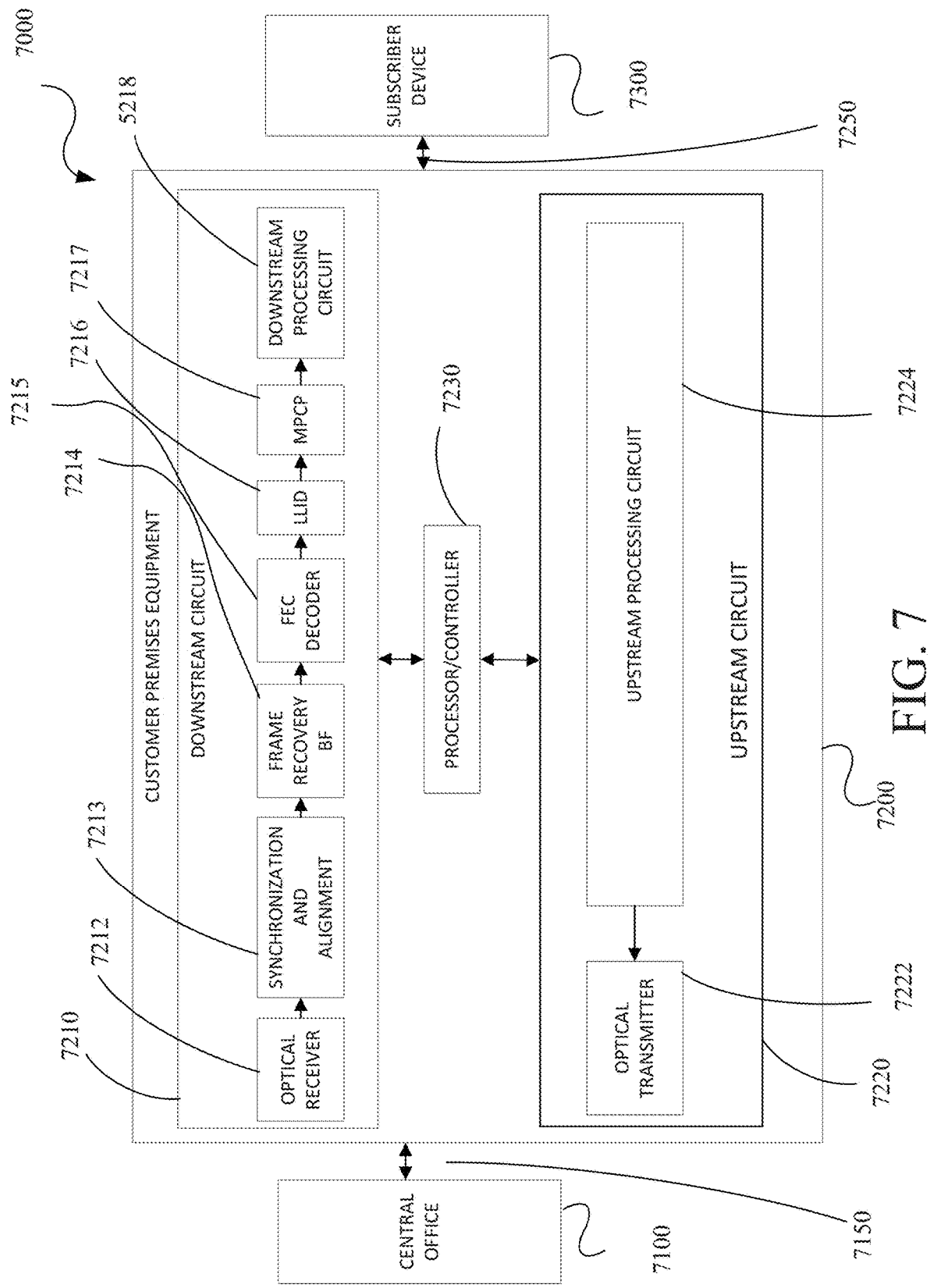
FIG. 7 is a diagram of an example architecture of a fiber access network with an example block diagram of a customer premises equipment (CPE) in accordance with embodiments of this disclosure.

FIG. 7 is a diagram of an example architecture of a fiber access network 7000 in accordance with embodiments of this disclosure. In an implementation, the fiber access network 7000 may include a central office 7100 which may be connected to a CPE 7200 via a simplex fiber 7150. In an implementation, a hub may be used in lieu of or in addition to the central office. The CPE 7200 may be connected to a subscriber device 7300 using a variety of wired or wireless techniques 7250. In an implementation, the CPE 7200 is a P2P CPE. The central office 7100 may include servers, switches, transceivers, optical line terminal, and other equipment configured to transmit or stream downstream signals including data to the CPE 7200 and receive upstream signals including data from the CPE 7200. As noted, the CPE 7200 communicates with the central office 7100 and also communicates with the subscriber device 7300. The subscriber device 7300 may be any type of device which may communicate via the CPE 7200 including, but not limited to, routers, televisions, set top boxes, phones, computers, smart devices, and the like.

The CPE 7200 may include, but is not limited to, a downstream circuit 7210, an upstream circuit 7220, and a processor or controller 7230 connected to the downstream circuit 7210 and the upstream circuit 7220. The processor 7230 may implement the silent start procedure in cooperation with the downstream circuit 7210 and the upstream circuit 7220 as described herein. The downstream circuit 7210 may include, but is not limited to, an optical receiver 5212, a synchronizer and aligner 7213, a frame recovery block function 7214, a forward error correction (FEC) decoder 7215, a logical link identifier 7216, a multipoint control protocol identifier 7217, and a downstream processing circuit 7218. The upstream processing circuit 7220 may include, but is not limited to, an optical transmitter 7222 and an upstream processing circuit 7224. The central office 7100, CPE 7200 and subscriber device 7300 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

In an implementation, the logical link identifier 7216, the multipoint control protocol identifier 7217, or combinations thereof may function or operate as high-level link level validity detection device. In an implementation, the processor 7230 may implement the logical link identifier 7216, the multipoint control protocol identifier 7217, or combinations thereof. In an implementation, a high-level link level validity detection device may look for other network specific characteristics that differentiate the P2P access network from the P2MP access network. The logical link identifier 7216 and the multipoint control protocol identifier 7217 are illustrative.

In an implementation, the high-level link level validity detection device may look for the presence of the LLID or other like frame identifier information in the modified Ethernet preamble. The LLID is indicative of a P2MP access network, and specifically, the Ethernet Passive Optical Network (EPON) as defined in IEEE Std 802.3, which operates at speeds of 1 Gb/s (symmetric), 10 Gb/s (symmetric), or 10/1 Gb/s (asymmetric) or any other future speeds to be defined by the IEEE 802.3 Working Group. A standard P2P Ethernet preamble contains a repeating 0x55 pattern while a modified P2MP-specific preamble structure is defined in Clause 76 (for 10G-EPON) or Clause 65 (for 1G-EPON) in IEEE Std 802.3. A preamble value different than 0x55 is indicative of a P2MP network, allowing the high-level link level validity detection device to reliably detect if it is connected to a P2MP network and thus remain in the silent start mode. Although the LLID field and EPON are described herein, similar frame identifier fields are present in other P2MP access networks such as, but not limited to, GPON and XGPON, and may be herein used without departing from the specification and claims.

In an implementation, the high-level link level validity detection device may look for the presence of the MPCP frames or other like control information in the data stream. The P2MP OLT (in the central office 7100, for example) periodically sends MPCP frames in the downstream direction for various purposes (for example station discovery, station registration, bandwidth scheduling, etc.). Such MPCP frames are defined in Clause 77 (for 10G-EPON) or Clause 64 (for 1G-EPON) in IEEE Std 802.3, covering the existing P2MP standards. Once detected in the incoming data stream by high-level link level validity detection device, the CPE 7200 can reliably assume it is connected to a P2MP network and thus remain in the silent start mode. Although the MPCP field and EPON are described herein, similar control fields are present in other P2MP access networks such as, but not limited to, GPON and XGPON, and may be used herein without departing from the specification and claims.

In an implementation, the CPE 7200 is a P2P CPE. Operationally, the CPE 7200 is connected to the central office 7100 via the simplex fiber 7150. The CPE 7200 is then powered up. This initiates a boot-up sequence, initializes internal electronics, enables the optical receiver 7212, and disables the optical transmitter 7222. That is, the CPE 7200 is in a silent mode with respect to upstream optical transmissions. A silent start procedure is initiated upon detection and/or reception by the optical receiver 7212 of a downstream optical signal from the central office 7100. The high-level link level validity detection device may determine or confirm that the downstream optical signal (after being processed through the optical receiver 5212, the synchronizer and aligner 7213, the frame recovery block function 7214, and the forward error correction (FEC) decoder 7215 as appropriate) is a valid downstream optical signal based on network specific characteristics including, but not limited to, LLID, MPCP, and/or combinations thereof. In an implementation, the validity determination may include determining whether the valid downstream optical signal has been received for a defined period of time. For example, the defined period of time may be relative to the start of the silent start procedure. In an implementation, the defined period of time may be at least one second. In an implementation, one or more of the network specific characteristics including, but not limited to, LLID, MPCP, and/or combinations thereof may be used in any combination to increase reliability of valid downstream optical signal detection. In this instance, validity is based on passing each of the network specific characteristics including, but not limited to, LLID, MPCP, and/or combinations thereof. That is, a single failure means that the downstream optical signal is invalid.

The CPE 7200 remains in the silent mode (the optical transmitter 7222 remains disabled) if the received downstream optical signal is invalid. The downstream optical signal is processed through the downstream processing circuit 7216 and sent to the subscriber device 7300, and the optical transmitter 7222 is enabled (via coordination with the processor 7230) if the received downstream optical signal is valid. Data from the subscriber device 7300 may then be processed via the upstream processing circuit and transmitted by the optical transmitter 7222 to the CPE 7100 as upstream optical signals. At this point, the CPE 7200 may be engaged in bidirectional transmissions or communications with the central office 7100. Bidirectional transmissions are maintained on continued reception of valid downstream optical signals. If the downstream optical signals are lost for a defined period of time or are found to be invalid, the CPE 7200 may enter or re-enter the silent mode or the silent start procedure. That is, the optical transmitter 7222 may be disabled. In an implementation, the defined period of time for loss of the downstream optical signals may be 20 milliseconds.

Figure 8:
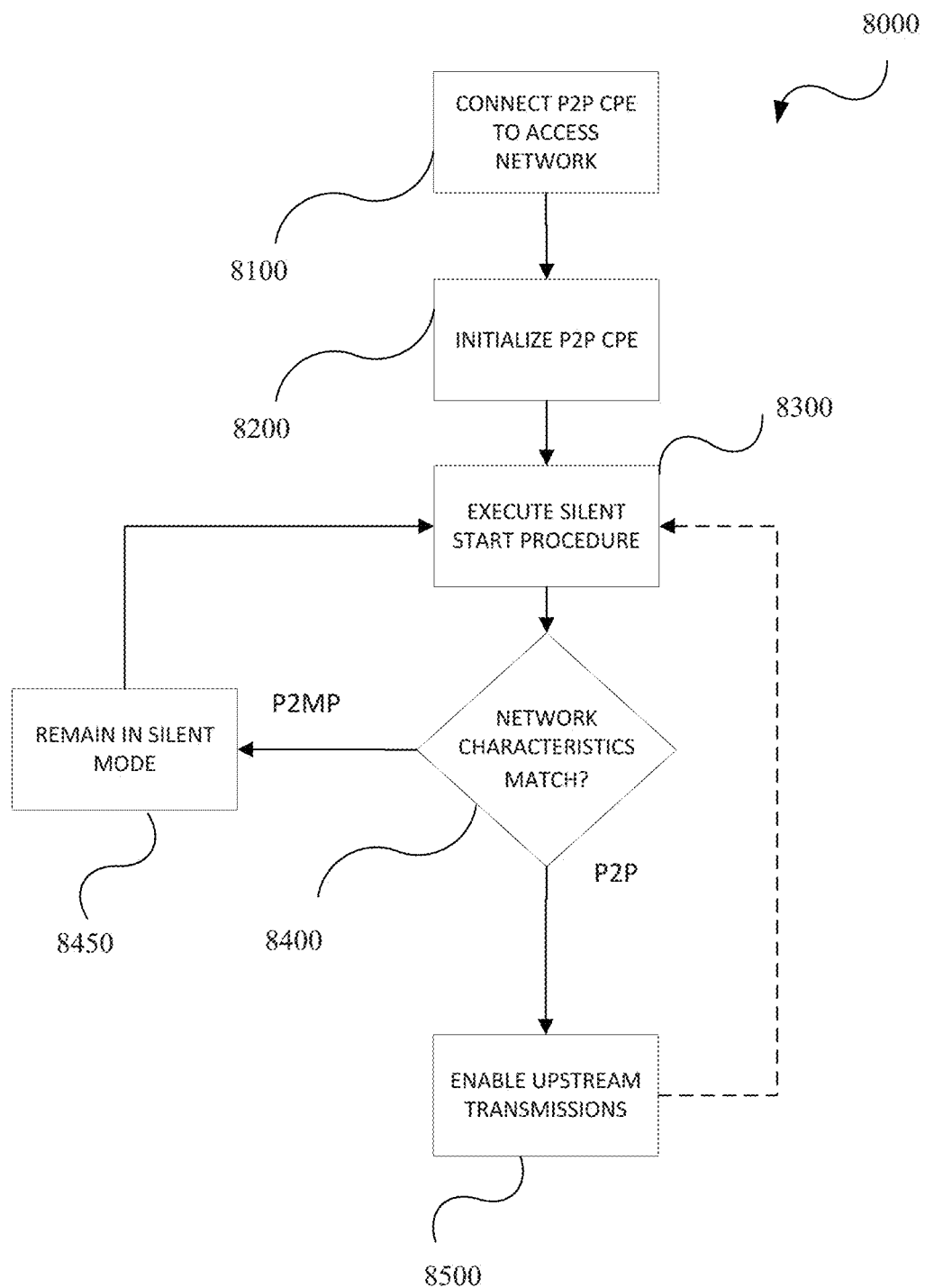
FIG. 8 is a flowchart of an example method for silent start when connecting to a fiber access network using the CPE of FIG. 7 in accordance with embodiments of this disclosure.

FIG. 8 Is a flowchart of an example method 8000 for silent start when connecting to a fiber access network in accordance with embodiments of this disclosure. The method 8000 includes: connecting 8100 a P2P CPE to a fiber access network; initializing 8200 the P2P CPE; executing 8300 a silent start procedure; checking 8400 for the presence (absence) of defined network characteristics in a downstream optical signal; remaining 8450 in a silent mode if the defined network characteristics are present (absent); and enabling 8500 upstream transmissions if the network characteristics are absent (present). For example, the technique 8000 may be implemented, as applicable and appropriate, by the CPE 1200 of FIG. 1 and the CPE 7200 of FIG. 7.

The method 8000 includes connecting 4100 a P2P CPE to a fiber access network. In an implementation, the P2P CPE is connected to the fiber access network using a SC. In an implementation, the fiber access network may a P2P access network or a P2MP access network.

The method 8000 includes initializing 8200 the P2P CPE. The initializing 8200 may include powering up the P2P CPE and then starting a boot-up sequence, initializing internal electronics, enabling downstream optical receiver, and disabling upstream optical transmitter. The P2P CPE is in a silent start mode.

The method 8000 includes executing 8300 a silent start procedure. The executing 8300 may include detecting a downstream optical signal from a central office or hub and then starting the silent start procedure.

The method 8000 includes checking 8400 for the presence (absence) of defined network characteristics in a downstream optical signal. In an implementation, a high-level link level validity detector may check for the presence of a LLID in the modified Ethernet preamble. In an implementation, the high-level link level validity detection device may look for the presence of the MPCP frames in the data stream. In an implementation, the high-level link level validity detection device may look for the LLID and the MPCP. In an implementation, the high-level link level validity detection device may include determining that the downstream optical signals are being received for a defined period of time. In an implementation, the defined period of time is relative to the start of the silent procedure. In an implementation, the defined period of time is 1 second.

The method 8000 includes remaining 8450 in a silent mode if the presence or absence of the network characteristics indicate a P2MP access network. The upstream optical transmitter remains disabled if the network characteristics indicate a P2MP access network.

The method 8000 includes enabling 8500 upstream transmissions if the network characteristics indicate a P2P access network. The upstream optical transmitter is enabled if the network characteristics indicate a P2MP access network.

This enables bidirectional communications between the P2P CPE and central office or hub. In an implementation, once upstream transmissions are enabled, the enabling 8500 may include determining for downstream optical signal communications loss. For example, if the downstream optical signals are lost for a defined period of time, the P2P CPE may enter or re-enter the silent mode or the silent start procedure. That is, the upstream optical transmitter may be disabled. In an implementation, the defined period of time for loss of the downstream optical signals may be 20 milliseconds. In an implementation, once upstream transmissions are enabled, the enabling 8500 may include determining a validity of additional downstream optical signals. If any of the additional downstream optical signals are invalid, the P2P CPE may enter or re-enter the silent mode or the silent start procedure. That is, the upstream optical transmitter may be disabled. In an implementation, once upstream transmissions are enabled, the enabling 8500 may include periodically determining a validity of additional downstream optical signals. If any of the additional downstream optical signals are invalid, the P2P CPE may enter or re-enter the silent mode or the silent start procedure. That is, the upstream optical transmitter may be disabled.

Figure 9:
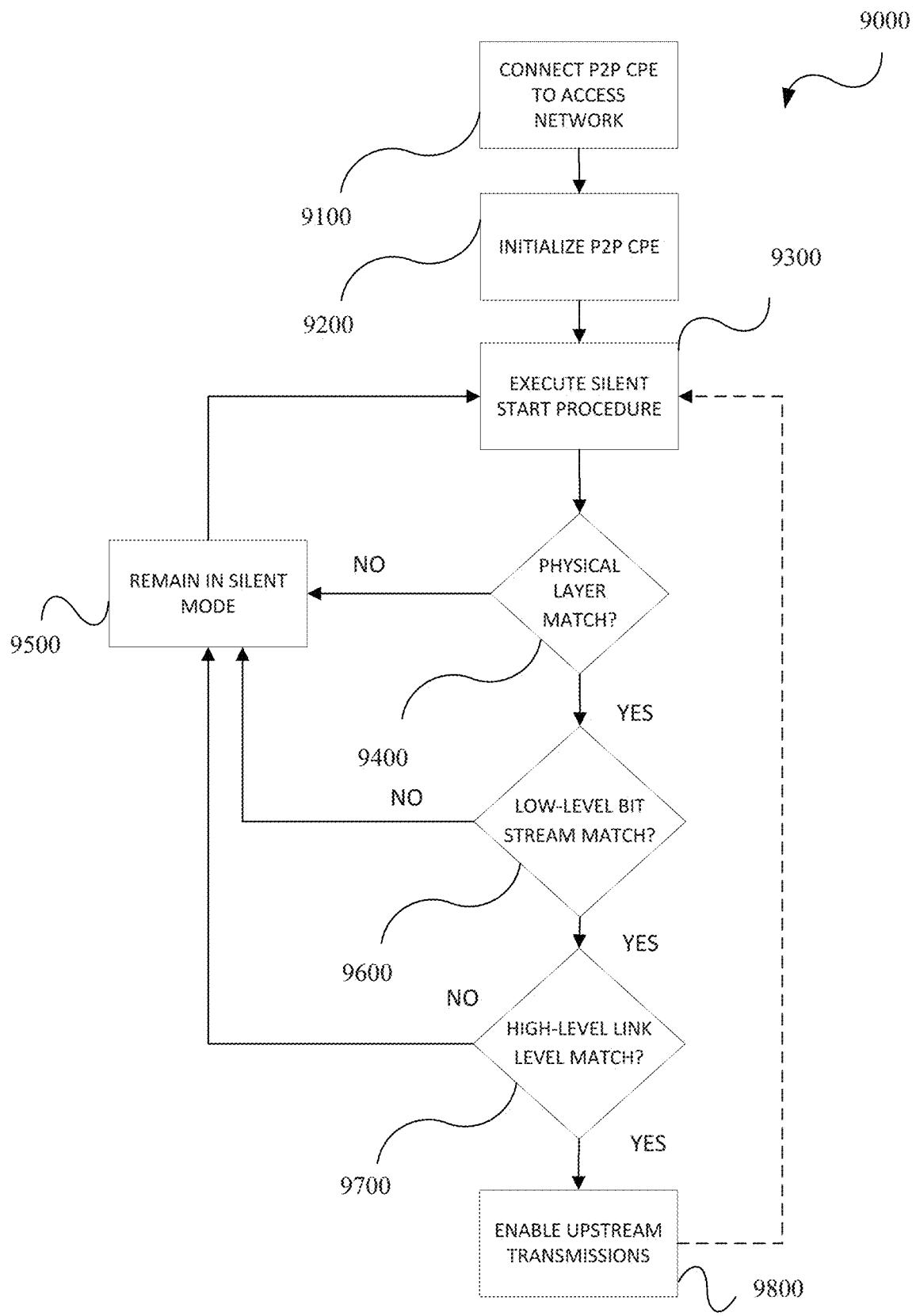
FIG. 9 is a flowchart of an example method for silent start when connecting to a fiber access network in accordance with embodiments of this disclosure.

FIG. 9 is a flowchart of an example method 9000 for silent start when connecting to a fiber access network in accordance with embodiments of this disclosure. The method 9000 includes: connecting 9100 a P2P CPE to a fiber access network; initializing 9200 the P2P CPE; executing 9300 a silent start procedure; checking 9400 physical layer characteristics; remaining 9500 in a silent mode if physical layer characteristics do not match; checking 9600 low-level bit stream characteristics; remaining 9500 in a silent mode if low-level bit stream characteristics do not match; checking 9700 high-level link level characteristics; remaining 9500 in a silent mode if high-level link level characteristics do not match; and enabling 9800 upstream transmissions if valid downstream optical signal. In an implementation, the checking 9400 physical layer characteristics, the checking 9600 low-level bit stream characteristics, and the checking 9700 high-level link level characteristics are all implemented to provide increased validity detection reliability. The technique 9000, for example, may be implemented, as applicable and appropriate, by the CPE 1200 of FIG. 1, CPE 3200 of FIG. 3, CPE 5200 of FIG. 5 and/or the CPE 7200 of FIG. 7, as appropriate and as applicable.

The method 9000 includes connecting 9100 a P2P CPE to a fiber access network. In an implementation, the P2P CPE is connected to the fiber access network using a SC. In an implementation, the fiber access network may a P2P access network or a P2MP access network.

The method 9000 includes initializing 9200 the P2P CPE. The initializing 9200 may include powering up the P2P CPE and then starting a boot-up sequence, initializing internal electronics, enabling downstream optical receiver, and disabling upstream optical transmitter. The P2P CPE is in a silent mode.

The method 9000 includes executing 9300 a silent start procedure. The executing 9300 may include receiving a downstream optical signal from a central office or hub and then starting the silent start procedure.

The method 9000 includes checking 9400 physical layer characteristics of a downstream optical signal. In an implementation, the physical layer characteristic is a defined wavelength or range of wavelengths and applies the description related to FIGS. 1 and 2. In an implementation, the determining 9400 may include determining that the downstream optical signals are being received for a defined period of time. In an implementation, the defined period of time is relative to the start of the silent procedure. In an implementation, the defined period of time is 1 second. In an implementation, the checking 9400 is optional and the validity determination starts with the checking 9600. In an implementation, the checking 9400 is optional and the validity determination starts with the checking 9700.

The method 9000 includes remaining 9500 in a silent mode if physical layer characteristics do not match. The upstream optical transmitter remains disabled if physical layer characteristics do not match.

The method 9000 includes checking 9600 low-level bit stream characteristics of the downstream optical signal. In an implementation, the low-level bit stream characteristics are line coding, frame structure, parity data, and/or combinations thereof. In an implementation, the checking 9600 may include one or more of the low-level bit stream characteristics. In an implementation, the checking 9400 may include determining that the downstream optical signals are being received for a defined period of time. In an implementation, the defined period of time is relative to the start of the silent procedure. In an implementation, the defined period of time is 1 second. In an implementation, the checking 9600 is optional and the validity determination starts with the checking 9700.

The method 9000 includes remaining 9500 in a silent mode if the low-level bit stream characteristics do not match. The upstream optical transmitter remains disabled if the low-level bit stream characteristics do not match.

The method 9000 includes checking 9700 high-level link level characteristics for the downstream optical signal. In an implementation, the high-level link level characteristics are one or more network characteristics. In an implementation, the high-level link level characteristics are one or more of LLID and MPCP. In an implementation, the determining 9400 may include determining that the downstream optical signals are being received for a defined period of time. In an implementation, the defined period of time is relative to the start of the silent procedure. In an implementation, the defined period of time is 1 second. In an implementation, the checking 9700 is optional.

The method 9000 includes remaining 9500 in a silent mode if the high-level link level characteristics do not match. The upstream optical transmitter remains disabled if the high-level link level characteristics do not match.

The method 9000 includes enabling 6800 upstream transmissions if the applicable physical layer characteristics, low-level bit stream characteristics, and/or the high-level link level characteristics match. The upstream optical transmitter is enabled if the downstream optical signal is valid. This enables bidirectional communications between the P2P CPE and central office or hub. In an implementation, once upstream transmissions are enabled, the enabling 9800 may include determining for downstream optical signal communications loss. For example, if the downstream optical signals are lost for a defined period of time, the P2P CPE may enter or re-enter the silent mode or the silent start procedure. That is, the upstream optical transmitter may be disabled. The In an implementation, the defined period of time for loss of the downstream optical signals may be 20 milliseconds. In an implementation, once upstream transmissions are enabled, the enabling 9800 may include determining a validity of additional downstream optical signals. If any of the additional downstream optical signals are invalid, the P2P CPE may enter or re-enter the silent mode or the silent start procedure. That is, the upstream optical transmitter may be disabled. In an implementation, once upstream transmissions are enabled, the enabling 9800 may include periodically determining a validity of additional downstream optical signals. If any of the additional downstream optical signals are invalid, the P2P CPE may enter or re-enter the silent mode or the silent start procedure. That is, the upstream optical transmitter may be disabled.

In general, a method for silent start when connecting a customer premises equipment (CPE) to a fiber access network includes initializing the CPE, wherein the CPE is entered into a silent mode, and executing a silent start procedure. The silent start procedure includes determining a validity of a downstream optical signal by checking defined characteristics against characteristics of the downstream optical signal, remaining in a silent mode for an invalid downstream optical signal, and enabling an upstream optical transmitter for a valid downstream optical signal. In an implementation, the method includes disabling the upstream optical transmitter. In an implementation, where the determining a validity of a downstream optical signal further includes receiving the downstream optical signal as a valid downstream optical signal when a wavelength of the downstream optical signal matches a defined wavelength. In an implementation, where the determining a validity of a downstream optical signal further includes indicating the downstream optical signal as a valid downstream optical when a line coding of the downstream optical signal matches a defined line coding. In an implementation, where the determining a validity of a downstream optical signal further includes indicating the downstream optical signal as a valid downstream optical when a frame structure of the downstream optical signal matches a defined frame structure. In an implementation, where the determining a validity of a downstream optical signal further includes indicating the downstream optical signal as a valid downstream optical when parity data of the downstream optical signal matches a defined parity data. In an implementation, where the determining a validity of a downstream optical signal further includes indicating the downstream optical signal as an invalid downstream optical when a network characteristic of the downstream optical signal matches a defined network characteristic. In an implementation, where the network characteristic is at least one of a frame identifier information and a control information. In an implementation, where the determining a validity of a downstream optical signal further includes indicating the downstream optical signal as an invalid downstream optical when a logical link identifier of the downstream optical signal matches a defined logical link identifier. In an implementation, where the determining a validity of a downstream optical signal further includes indicating the downstream optical signal as an invalid downstream optical when a multi-point control protocol of the downstream optical signal matches a defined multi-point control protocol. In an implementation, where the determining a validity of a downstream optical signal further includes indicating the downstream optical signal as a valid downstream optical when a line coding of the downstream optical signal matches a defined line coding, and indicating the downstream optical signal as a valid downstream optical when a frame structure of the downstream optical signal matches a defined frame structure. In an implementation, where the determining a validity of a downstream optical signal further includes indicating the downstream optical signal as an invalid downstream optical when a network characteristic of the downstream optical signal matches a defined network characteristic.

In general, a method for silent start when connecting a customer premises equipment (CPE) to a fiber access network, the method including initializing the CPE, wherein an upstream optical transmitter is disabled and executing a silent start procedure. The silent start procedure including determining a validity of a downstream optical signal by checking defined physical layer characteristics against physical layer characteristics of the downstream optical signal, determining a validity of a downstream optical signal by checking defined low-level bit stream characteristics against low-level bit stream characteristics of the downstream optical signal, determining a validity of a downstream optical signal by checking defined high-level link level characteristics against high-level link level characteristics of the downstream optical signal, maintaining the upstream optical transmitter as disabled if one of the physical layer characteristics, the low-level bit stream characteristics, or the high-level link level characteristics indicates an invalid downstream optical signal, and enabling the upstream optical transmitter if all the physical layer characteristics, the low-level bit stream characteristics, and the high-level link level characteristics indicate a valid downstream optical signal. In an implementation, the physical layer characteristics are a wavelength or range of wavelengths. In an implementation, the low-level bit stream characteristics are at least one of line coding, frame structure, and parity data check. In an implementation, the high-level link level characteristics are at least one of logical link identifier and multi-point control protocol. In an implementation, the high-level link level characteristics is at least one network characteristic.

In general, a customer premises equipment includes an upstream optical transmitter, downstream circuitry, and a processor in communication with the upstream optical transmitter and the downstream circuitry. The processor configured to disable the upstream optical transmitter, validate a downstream optical signal by checking at least one expected characteristic against a downstream optical signal characteristic, maintain the upstream optical transmitter as disabled for an invalid downstream optical signal, and enable the upstream optical transmitter for a valid downstream optical signal. In an implementation, the at least one expected characteristic is at least one of a wavelength, a range of wavelengths, a line coding, a frame format, parity data, point to multipoint network information, point to point network information, logical link identifier, frame identifier information, control information, and a multi-point control protocol. In an implementation, the downstream optical signal is valid if all expected characteristics and downstream optical signal characteristics indicate validity.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for silent start when connecting a customer premises equipment (CPE) to a fiber access network, the method comprising:
    initializing the CPE, wherein the CPE is entered into a silent mode;
    executing a silent start procedure, wherein the executing comprises:
        determining a validity of a downstream optical signal by checking whether parity data of the downstream optical signal matches a defined parity data;
        remaining in a silent mode for an invalid downstream optical signal; and
        enabling an upstream optical transmitter for a valid downstream optical signal.

2. The method of claim 1, wherein the silent mode comprises:
    disabling the upstream optical transmitter.

3. The method of claim 1, further comprising:
    receiving the downstream optical signal as a valid downstream optical signal when the parity data of the downstream optical signal matches the defined parity data.

4. The method of claim 1, wherein the determining further comprising:
    decoding encoded codewords; and
    checking whether decoded data matches transmitted parity data.

5. The method of claim 4, further comprising:
    determining whether downstream optical signals have been received for a defined period of time.

6. The method of claim 5, wherein the defined period of time is relative to a start of the silent start.

7. The method of claim 1, wherein the determining a validity of a downstream optical signal further comprising:
    indicating the downstream optical signal as an invalid downstream optical when a multi-point control protocol of the downstream optical signal matches a defined multi-point control protocol.

8. The method of claim 7, further comprising:
    determining whether downstream optical signals have been received for a defined period of time.

9. The method of claim 8, wherein the defined period of time is relative to a start of the silent start.

10. A method for silent start when connecting a customer premises equipment (CPE) to a fiber access network, the method comprising:
    initializing the CPE, wherein the CPE is entered into a silent mode;
    executing a silent start procedure, wherein the executing comprises:
        determining invalidity of a downstream optical signal by checking whether a multi-point control protocol of the downstream optical signal matches a defined multi-point control protocol;
        remaining in a silent mode for an invalid downstream optical signal; and
        enabling an upstream optical transmitter for a valid downstream optical signal.

11. The method of claim 10, wherein the silent mode comprises:
    disabling the upstream optical transmitter.

12. The method of claim 10, further comprising:
    determining whether downstream optical signals have been received for a defined period of time.

13. The method of claim 12, wherein the defined period of time is relative to a start of the silent start.

14. The method of claim 10, wherein the determining a validity of a downstream optical signal further comprising:
    indicating the downstream optical signal as a valid downstream optical when parity data of the downstream optical signal matches a defined parity data.

15. The method of claim 14, wherein the indicating further comprising:
    decoding encoded codewords; and
    checking whether decoded data matches transmitted parity data.

16. The method of claim 15, further comprising:
    receiving the downstream optical signal as a valid downstream optical signal when the parity data of the downstream optical signal matches the defined parity data.

17. A method for silent start when connecting a customer premises equipment (CPE) to a fiber access network, the method comprising:
    initializing the CPE, wherein an upstream optical transmitter is disabled;
    executing a silent start procedure, wherein the executing comprises:
        determining a validity of a downstream optical signal by checking defined characteristics against characteristics of the downstream optical signal;
        determining invalidity of a downstream optical signal by checking whether a multi-point control protocol of the downstream optical signal matches a defined multi-point control protocol;
        maintaining the upstream optical transmitter as disabled if one of a parity data check or a multi-point control protocol check indicates an invalid downstream optical signal; and
        enabling the upstream optical transmitter if the parity data check and the multi-point control protocol check indicate a valid downstream optical signal.

18. The method of claim 17, wherein a first determining further comprising:
    decoding encoded codewords; and
    checking whether decoded data matches transmitted parity data.

19. The method of claim 18, wherein the encoded codewords are forward error check encoded.

20. The method of claim 18, further comprising:
    receiving the downstream optical signal as a valid downstream optical signal when the parity data of the downstream optical signal matches the defined parity data and the multi-point control protocol of the downstream optical signal does not match a defined multi-point control protocol.

\* \* \* \* \*